United States Patent
Nair et al.

(10) Patent No.: US 12,126,675 B2
(45) Date of Patent: Oct. 22, 2024

(54) DISTRIBUTED COMPUTING SYSTEM EMPLOYING APPLICATION SLICE OVERLAY NETWORKS

(71) Applicant: Avesha, Inc., Chelmsford, MA (US)

(72) Inventors: Raj Nair, Lexington, MA (US); Prabhudev Navali, Westford, MA (US); Sudhir Halbhavi, Bangalore (IN); Chin-Cheng Wu, Carlisle, MA (US); Eric Peterson, Carlisle, MA (US); Prasad Dorbala, Lexington, MA (US)

(73) Assignee: Avesha, Inc., Chelmsford, MA (US)

( * ) Notice: Subject to any disclaimer, the term of this patent is extended or adjusted under 35 U.S.C. 154(b) by 0 days.

(21) Appl. No.: 18/223,266

(22) Filed: Jul. 18, 2023

(65) Prior Publication Data

US 2023/0362236 A1    Nov. 9, 2023

Related U.S. Application Data

(63) Continuation-in-part of application No. 17/394,785, filed on Aug. 5, 2021, now Pat. No. 11,736,559.
(Continued)

(51) Int. Cl.
*H04L 67/1001*    (2022.01)
*H04L 67/51*    (2022.01)

(52) U.S. Cl.
CPC .......... *H04L 67/1001* (2022.05); *H04L 67/51* (2022.05)

(58) Field of Classification Search
CPC ........................ H04L 67/1001; H04L 67/51
See application file for complete search history.

(56) References Cited

U.S. PATENT DOCUMENTS

| 10,621,005 B2 | 4/2020 | Wong et al. |
| 2019/0273746 A1 | 9/2019 | Coffing |

(Continued)

FOREIGN PATENT DOCUMENTS

| EP | 3720181 A1 | 10/2020 |
| WO | 20180053122 A1 | 3/2018 |

OTHER PUBLICATIONS

Ali, et al.; "Cloud-Native Network Slicing Using Software Defined Networking Based Multi-Access Edge Computing: A Survey," IEEE Access, IEEE, USA, vol. 9, Jan. 8, 2021, pp. 10903-10924.
(Continued)

*Primary Examiner* — June Sison
(74) *Attorney, Agent, or Firm* — BainwoodHuang

(57) ABSTRACT

A distributed computing system has one or more clusters each including compute nodes connected by a cluster network and executing microservices in respective containers organized into pods. The system includes application slice components (routers, slice gateways) distributed among the clusters to define and operate application slices each providing application slice services for respective sets of pods distributed among the clusters. Each slice gateway provides an interface between local pods of the application slice and remote pods of the application slice on a respective different cluster. Each slice is associated with namespaces, network policies and resource quotas for the applications onboarded on the slice. The slice routers and slice gateways for a given application slice form a respective slice-specific overlay network providing cross-cluster network services including service discovery and traffic forwarding with isolation from other application slices that co-reside on the clusters.

20 Claims, 5 Drawing Sheets

Related U.S. Application Data

(60) Provisional application No. 63/183,244, filed on May 3, 2021, provisional application No. 63/061,364, filed on Aug. 5, 2020.

(56) References Cited

U.S. PATENT DOCUMENTS

| | | |
|---|---|---|
| 2020/0153699 A1 | 5/2020 | Bai et al. |
| 2020/0257566 A1 | 8/2020 | Ganguli et al. |
| 2021/0014133 A1 | 1/2021 | Maciocco et al. |
| 2021/0019194 A1 | 1/2021 | Bahl et al. |
| 2021/0112049 A1 | 4/2021 | Yigit et al. |
| 2021/0144517 A1 | 5/2021 | Guim Bernat et al. |
| 2022/0014963 A1 | 1/2022 | Yeh et al. |
| 2022/0121455 A1 | 4/2022 | Hoban et al. |
| 2022/0318001 A1* | 10/2022 | Freeman ............. G06F 9/45558 |
| 2022/0350675 A1* | 11/2022 | Navali ................. H04L 47/781 |
| 2022/0374259 A1* | 11/2022 | Rao ........................ G06F 9/485 |
| 2023/0119503 A1* | 4/2023 | Maheve ............. H04L 63/0869 709/221 |
| 2023/0140034 A1* | 5/2023 | Bui ..................... H04L 41/5054 709/203 |

OTHER PUBLICATIONS

Anonymous; "Multi-Tenant Design Considerations for Amazon EKS Clusters," Mar. 27, 2020, retrieved from the internet: URL:https://avs.amazon.com/blogs/containers/multi-tenant-design-considerations-for-amazon-eks-clusters/ [retrieved on May 30, 2022], pp. 1-7.

Buzachis, Alina, et al.: "Towards Osmotic Computing: Analyzing Overlay Network Solutions to Optimize the Deployment of Container-Based Microservices in Fog, Edge and IoT Environments", 2018 IEEE 2nd International Conference on Fog and Edge Computing (ICFEC), IEEE, May 1, 2018 (May 1, 2018), pp. 1-10.

International Search Report dated Dec. 2, 2021, for application No. PCT/US2021/044643, 16 pages.

Truyen, et al; "Towards a Container-Based Architecture for Multi-Tenant SAAS Applications," Adaptive and Reflective Middleware, ACM, 2 Penn Plaza, Suite 701 New York, NY 10121-0701 USA, Dec. 12, 2016, pp. 1-6.

U.S. Appl. No. 62/914,974, filed 2019.

* cited by examiner

DISTRIBUTED COMPUTING SYSTEM EMPLOYING APPLICATION SLICE OVERLAY NETWORKS

BACKGROUND

The present invention relates to the field of computing systems with automated deployment, scaling, and management of containerized applications a computing environment.

SUMMARY

A distributed computing system has clusters interconnected by a substrate network, wherein each cluster includes a plurality of compute nodes connected by a cluster network and collectively executing a set of microservices in respective containers organized into multi-container pods. The distributed computing system includes application slice components (plurality of slice routers, slice gateways) distributed among the clusters to define and operate a plurality of application slices each providing application slice services for respective sets of application pods distributed among the clusters. Each slice is associated with namespaces, network policies and resource quota and applications in the associated namespaces are onboarded on to the slice. Each slice gateway provides an interface between local services, pods of the application slice and remote services, pods of the given application slice on a respective different cluster. The slice routers and slice gateways for a given application slice collectively forming a respective slice-specific overlay network providing cross-cluster network services including service discovery and traffic forwarding with isolation from other applications and application slices that co-reside on the clusters with the given application slice.

BRIEF DESCRIPTION OF THE DRAWINGS

The foregoing and other objects, features and advantages will be apparent from the following description of embodiments of the invention, as illustrated in the accompanying drawings in which like reference characters refer to the same parts throughout the different views.

DETAILED DESCRIPTION

Figure 1:
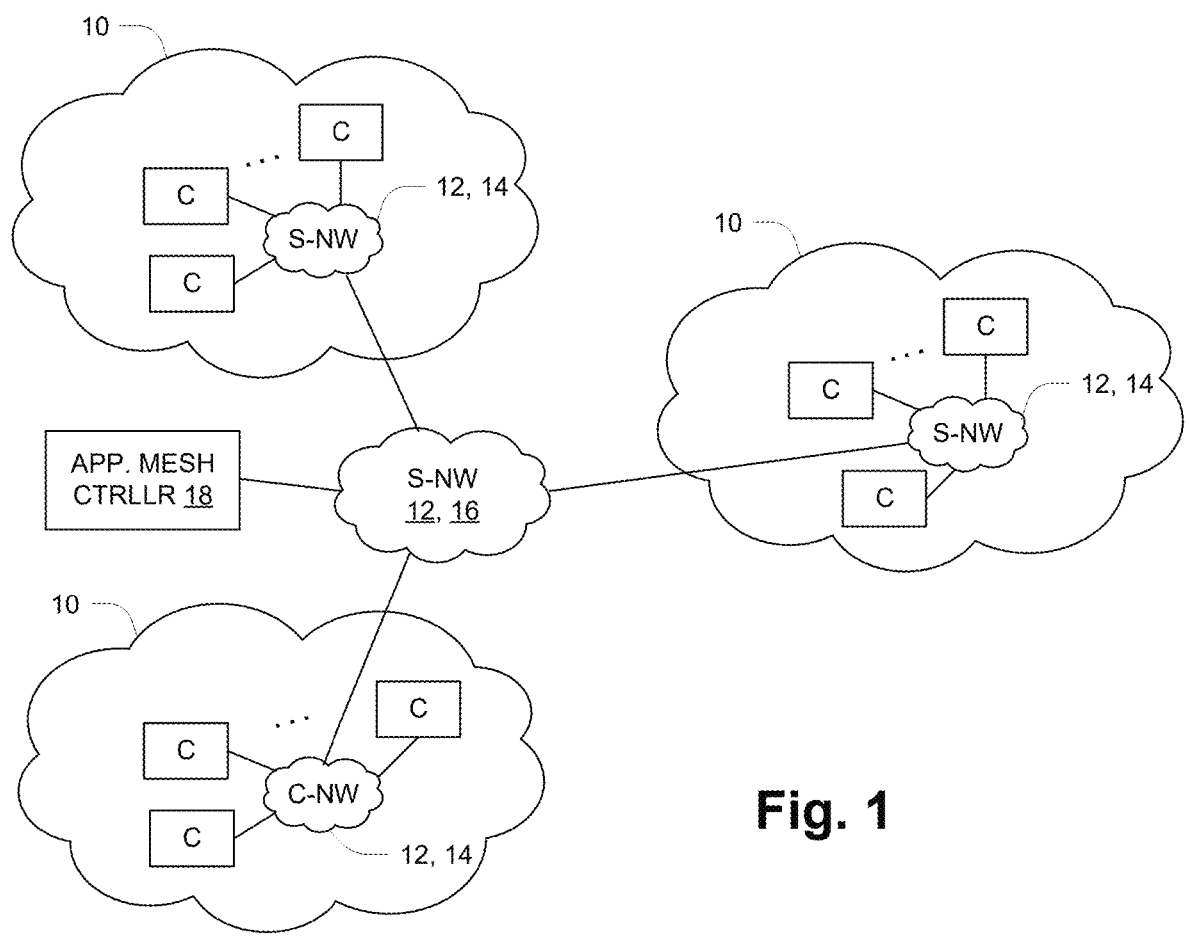
FIG. 1 is a block diagram of a distributed computing system.

The content of the following U.S. patent applications are hereby incorporated by reference in their entirety:

1. Application No. 63/061,364 filed Aug. 5, 2020, entitled "Real Time Edge Inference Platform";
2. Application No. 63/183,244 filed May 3, 2021, entitled "Smart Application Framework";
3. Application Ser. No. 17/394,785 Aug. 5, 2021, entitled "Providing A Set Of Application Slices Within An Application Environment".

Overview

The disclosure is generally directed to a container-based service deployment system having Pod/Node/Cluster architecture and corresponding management and operational functions, which in one embodiment may be realized using Kubernetes® components.

In known container-based service deployment systems, there is a need for cross-cluster mechanisms to improve ease and flexibility of service deployment, efficient operation, etc. Existing techniques may focus on interconnecting different IP L3 domains in different Kubernetes clusters, or on interconnecting Kubernetes clusters at L4-L7 layers. As an example, there are existing connectivity solutions based on Kubernetes container network interface (CNI) (e.g., Calico™ overlay networking) that focus on connectivity between hosts across clusters.

Teams deploying applications on one or more Kubernetes clusters leads to operational challenges to manage the namespaces and associated shared resources across all the applications deployed. In some cases, this can lead to security concerns and resource contention due to resource intensive applications. In addition, with multi-cluster deployments admins have tedious operational management challenges to extend the normalized resource quota management, namespace sameness and configuration and configuration drift management. They lack a normalized way to support configuration and features like secure overlay network for network traffic isolation, application namespaces association, namespace sameness, resource quota management and isolation based on container and overlay network policies, zero-trust security related features, and slice optimization specific to customer applications across one or more clusters.

The present disclosure is directed to methods an apparatus that address the above shortcomings using a construct called Application Slice. Among other aspects, the use of application slice can feature application namespace bindings to a respective slice and associated resource quota management and namespace based isolation, within a single or multicluster application slice.

The Mesh platform (also known as "Mesh" or "KubeSlice") combines network, application, Kubernetes, and deployment services in a framework to accelerate application deployment in a multi-cluster environment. KubeSlice achieves this by creating logical application slice boundaries that allow pods and services to communicate seamlessly across clusters, clouds, edges, and data centers. As enterprises expand application architectures to span multiple clusters located in data centers or cloud provider regions, or across cloud providers, Kubernetes clusters need the ability to fully integrate connectivity and pod-to-pod communications with namespace propagation across clusters. The Smart Application Framework makes it easier to scale and operate cloud business. It infuses intelligence and automation on top of the existing infrastructure to make application infrastructure smarter and grow efficiently while improving quality. The framework includes: (1) the Smart Application Mesh (KubeSlice/Mesh Platform); (2) the Application Slice; and (3) the Smart Applications like AIOps driven Load Balancer or workload placement.

The platform enables creating multiple logical slices in a single cluster or group of clusters regardless of their physical location. Existing intra-cluster communication remains local to the cluster utilizing the CNI interface. Application slice provides isolation of network traffic between clusters by creating an overlay network for inter-cluster communication. Clusters are interconnected using secure gateways. One or more clusters may be attached to the slice. Each slice has its own separate L3 domain address space—separate Subnet. Each cluster that is part of the slice has a part of the slice-subnet. Application Pods are connected to a slice and can connect to each other on slice subnet creating an overlay L3 network using slice routers cross the slice. The overlay L3 network is collection of virtual wires (vWires), and the connectivity is driven by the network service names (namespace-driven) associating workloads/applications to a slice. Applications/Pods that are attached to slice have an IP interface to the slice specific L3 address space. Each slice may include a global namespace that is normalized across the slice—in all the clusters that are attached to slice. All the services that are attached to the slice (across one or more clusters) are visible to each other via slice wide service discovery. Exporting services from one attached cluster in the slice to all the clusters that are attached to the slice. Exported services are only visible to the applications/services attached to the slice.

The platform architecture consists of several components that interact with each other to manage the lifecycle of the slice components and its overlay network. Mesh platform enables creation of a collection of microservices and or collection of virtual machines irrespective of location be in a data center or in multi-cloud to form a domain. This domain acts as micro segmentation to the rest of the workloads. Slice has the capability of spanning across clusters and geographical boundaries. Application slice is an overlay on existing service mesh or hybrid footprint. The platform enables zero trust security across all workloads/microservices. The system federates security for service-to-service communication. A security controller works as a typical Kubernetes-native application with Custom Resources and Controllers with no additional infrastructure or custom configuration formats.

The platform enables customers to extend compute resources to Edge. A small footprint will enable workloads to scale-out to edge compute and appear as a cloud extension to the rest of the services The system can establish Reinforcement Learning for load balancing service to service communication. RL based load balancing of service-to-service communication helps better utilization of resources and enables huge positive impact to customer experience. RL based load balancing helps to identify bottlenecks in service-to-service communication in a proactive measure.

The Smart Application Overlay works on a multi-cluster environment with slice. In a Multi-cluster environment, service discovery, security and name space are normalized to create a surface area which has fine grain traffic control and security posture.

The Mesh provides a seamless way to manage, connect, secure, and observe applications that need to run workloads on the edge as well as public cloud.

The disclosed system addresses an opportunity that has arisen from the development of the 'Service Mesh' (like Istio™) and 'Network Service Mesh (NSM)' constructs originating from the development of Kubernetes, microservices, and other technologies under the umbrella of 'Cloud Native Computing.' These technologies have enabled multi-cloud distributed applications with Kubernetes microservices clusters deployed across multiple public clouds, edge clouds and customer premise private clouds. It is now possible to create an application overlay infrastructure that interconnects distributed application clusters/Pods across domains. These application specific overlays can now provide a tight binding between an application and its overlay network. Applications can now specify the exact connectivity and QOS requirements required for the application. This allows application developers to build and deploy application overlay networks that support application driven traffic engineering/steering with network-level QOS on the underlying infrastructure.

In accordance with certain embodiments, disclosed herein is an "Application Slice"—a key feature of the Mesh Platform. The platform allows operators to build application slices—application overlays—that are a way of grouping application pods based on one or more organizing principles such as velocity of deployment, security, governance, teams, deployment environments like production/development/pre-production, etc. As mentioned, use of application slice can feature application namespace bindings to a slice and associated resource quota management and namespace based isolation.

The Mesh provides mechanisms to create and manage slices—create an overlay network, apply network policy and service discovery across the slice; and continuous monitoring of slices; observe the slice telemetry, service-to-service relationships, and traffic prioritization and management.

In some embodiments, the Mesh supports combinations of the following:

Operators that create, monitor, and manage application slice overlay networks that are specific to each set of distributed applications.

Connecting, securing, and deploying the microservices across multiple Kubernetes clusters using application slices. A cluster to be part of multiple slices simultaneously.

Applying Network Policies and Service Discovery across the slice, ensuring traffic isolation within their respective overlay networks while also managing traffic and its prioritization.

Observing slice telemetry and service-to-service relationships.

Provides separate independent L3 domain per slice

Provides an ability to create multiple slices in one or more clusters

Provides micro-segmentation in one or more clusters using application slices

Provides a mechanism to create and manage global namespace for application slice and normalize that across the slice worker clusters Provides mechanism to associate namespaces to application slices and normalize that across the slice worker clusters Provide mechanism to associated resource quotas to application slice and associated namespaces and normalize that across the slice worker clusters Provides mechanism to create and apply network policies to application slice normalize that across the slice worker clusters Provides secure inter-domain connectivity across slice worker clusters Separate VPN/IPSEC/L2TP/etc. tunnels, per slice network namespace Namespace-driven connectivity across the slice—using network service mesh Provides mechanism to integrate Service Mesh(es) across the slice Provides mechanisms to import/export services from/to separate Service Mesh control planes across clusters Provides mechanism to incorporate ingress/egress gateways to scale the service deployment and discovery Provides declarative mechanisms for slice management Provides an overlay data plane (CNI agnostic) and an associate control plane to build the overlay networks Provides mechanisms for namespace-driven intra-domain (within a cluster) and inter-domain (across clusters) connectivity over an overlay network.

Embodiments

FIG. 1 shows a wide-area distributed computer network having a plurality of distinct sections referred to as "clouds" 10 interconnected by a network referred to as a "substrate network" (S-NW) 12. The substrate network 12 has portions 14 within respective clouds 10 and a portion 16 that interconnects the clouds 10, as shown. Each cloud 10 includes a plurality of clusters C interconnected by the local substrate network portion 14. As generally known in the art, a "cloud" 10 is a collection of networked computing resources that exclusively share certain attributes such as common ownership/administration, physical infrastructure (e.g., datacenter(s)), Internet connectivity, etc. In the present context, a given cloud 10 may be of a variety of types, including for example a private cloud (e.g., company datacenter or campus), public cloud (e.g., leased service provider such as Amazon AWS, Microsoft Azure), etc. The substrate network 12 includes basic network infrastructure such as cabling, interfaces, physical switches, and routers, etc., along with higher-level components contributing to basic local-area and wide-area network interconnection (e.g., DNS servers, etc.).

Also shown in FIG. 1 is an application mesh controller (APP MESH CTRLLR) 18 connected into the substrate network 12 to be capable of communicating with components of the clusters C. The application mesh controller 18 is shown as a standalone subsystem connected to network portion 16 in FIG. 1, but in alternative embodiments it may reside in one of the clouds or in a separate cloud. In the present description the application mesh controller 18 may also be referred to as the "Backend" or "KubeSlice Controller".

Figure 2:
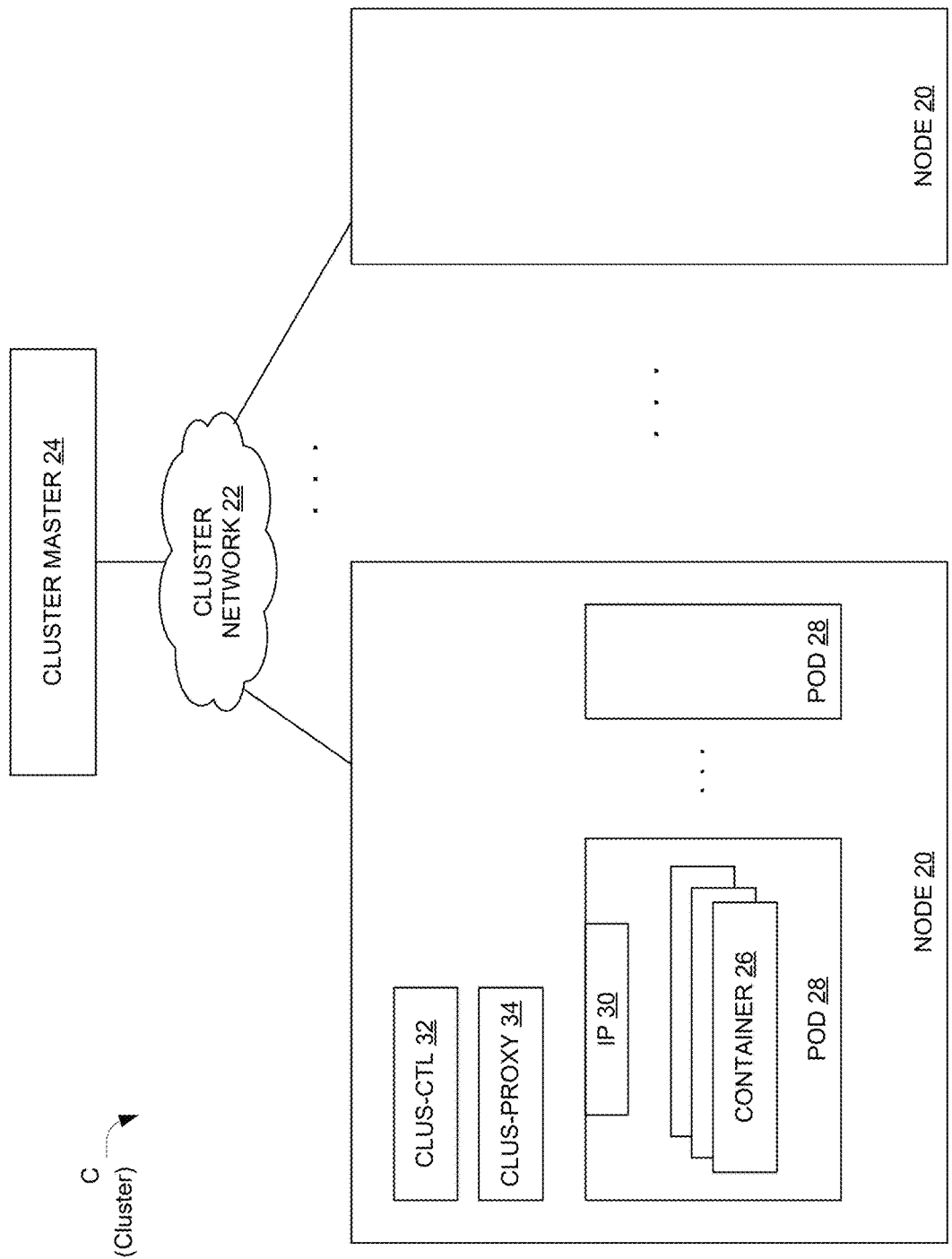
FIG. 2 is a block diagram of a cluster.

FIG. 2 shows certain internals of a cluster C. Its basic configuration is a collection of compute nodes 20 interconnected by a cluster network 22, which is specialized local network functionality within the cluster C defined on top of underlying local network infrastructure (cabling, switches, etc.). It also includes an overall cluster controller shown as a cluster master 24. A compute node 20 has hardware computing components such as memory, processors, I/O interface circuitry, etc. (not shown) as generally known. Within each compute node 20, computing resources are virtualized into containers 26, which are arranged into groups or sets referred to as "pods" 28. As generally known in the art, a container 26 serves as a lightweight environment for execution of an application, which in the present context is typically a "microservice" as described more below. The pod-based structuring is used to facilitate certain system-level activities such as network communications, compute scheduling, etc. To that end, each pod 28 has a respective network address (IP) 30, defined in the cluster network 22. Each node 20 also includes certain cluster management components including a cluster controller (CLUS-CTL) 32 and a cluster proxy (CLUS-PROXY) 34. In one embodiment, the general arrangement of FIG. 2 may be realized using a set of distributed-computing components known as Kubernetes®.

Figure 3:
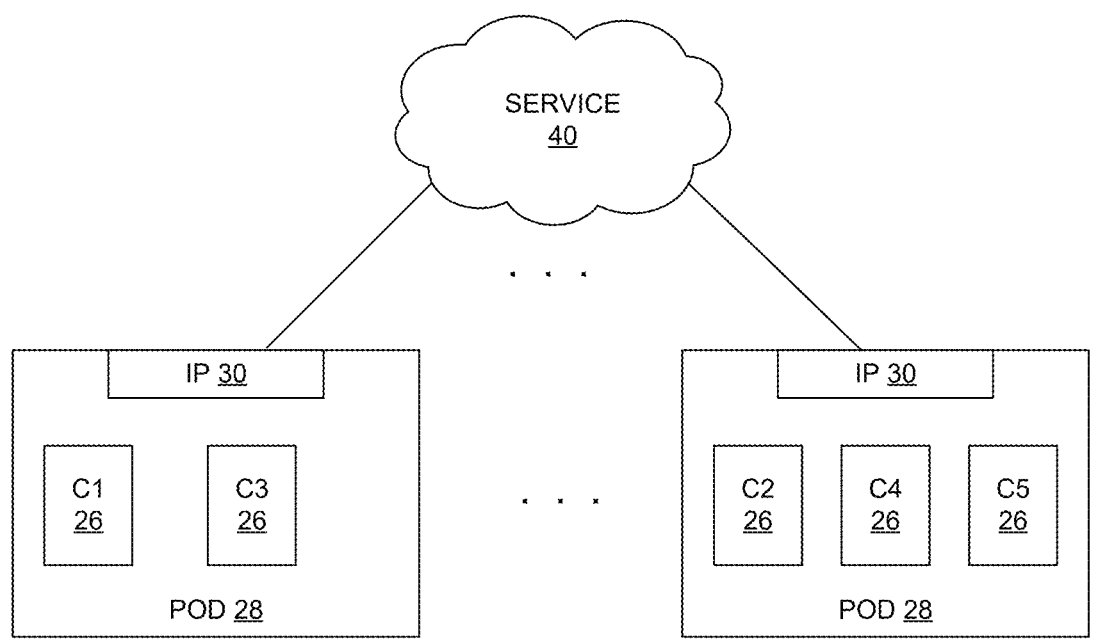
FIG. 3 is a schematic block diagram of a service model.

FIG. 3 illustrates a service model employed in the distributed network. A service 40 is realized using a distributed set of sub-services, also called "microservices", that are executed on respective containers 26 of various pods 28. In the illustrated simplified example, the service 40 has microservice components executing on contains C1 and C3 of one pod 28, and contains C2, C4 and C5 of another pod 28. The depiction in FIG. 3 highlights that the service 40 is a higher-level logic arrangement of components executing in the containers 26.

Figure 4:
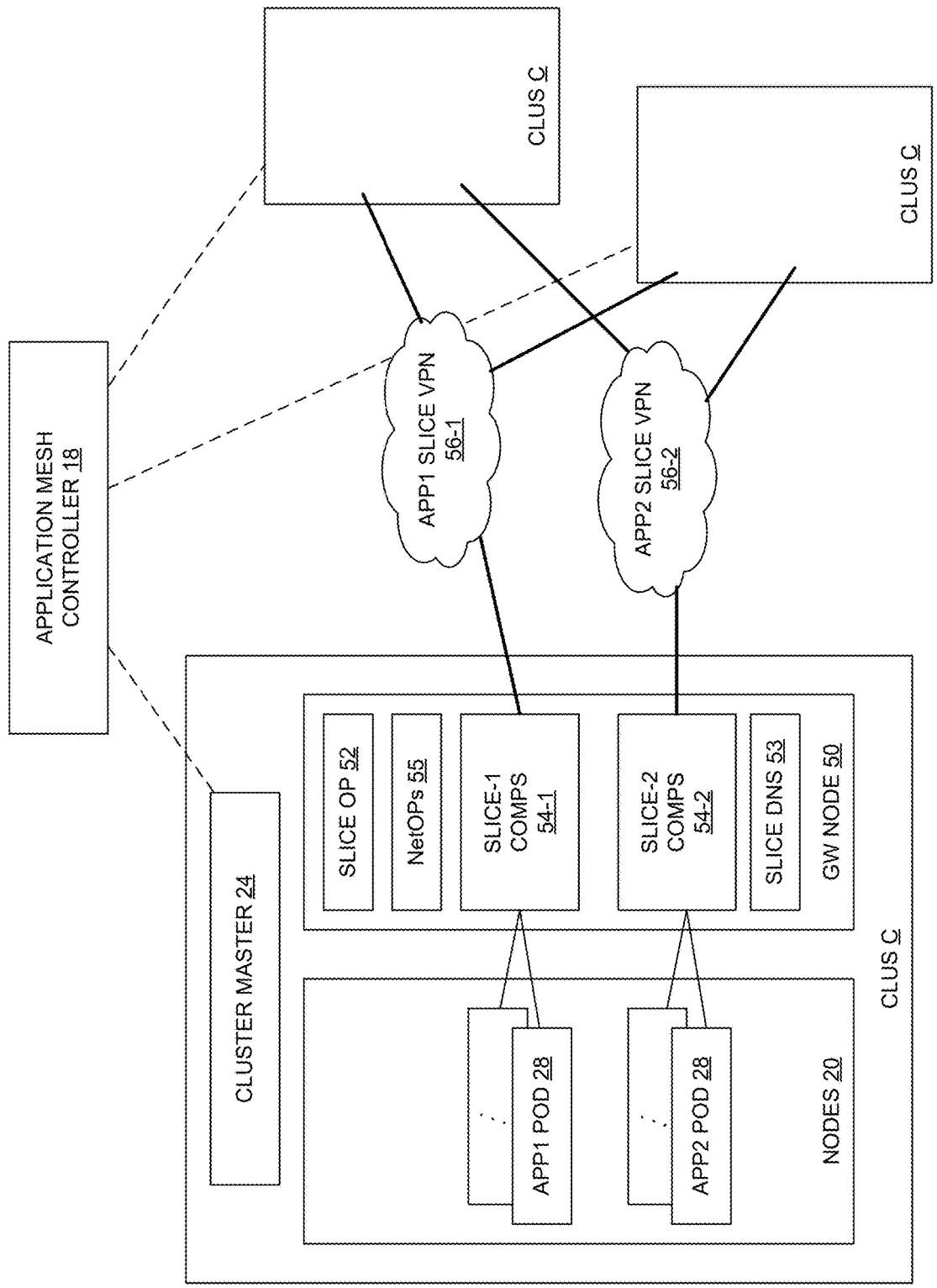
FIG. 4 is a block diagram of a multi-cluster arrangement employing application slice overlay networks.

FIG. 4 illustrates use of an application slice with overlay network and related functionality The clusters C are shown as including specialized gateway (GW) nodes 50, each including one or more slice operators (Slice OP) 52, one or more slice DNS servers 53, one or more NetOps (network operator) pods 55, and one or more sets of slice components (COMPS) 54 each for a corresponding slice (e.g., Slice-1 and Slice-2 as shown). Slice components (COMPS) 54 can include slice specific slice routers, ingress/egress gateways and VPN gateways. Corresponding sets of slice components 54 among the clusters C function to realize corresponding slice overlay networks 56, which are a specialized type of virtual private network (VPN). Thus, the Slice-1 components 54-1 on the clusters C realize an APP1 Slice VPN 56-1, and Slice-2 components 54-2 on the clusters C realize an APP2 Slice VPN 56-2, etc. Within each cluster C, each App Slice VPN 56 is used by a corresponding set of application components (microservices) executing in respective pods 28. Microservices or Application components 28 in pods can communicate with other applications or microservices any of the IP protocols like UDP, TCP, HTTP, GRPC, etc.

Figure 5:
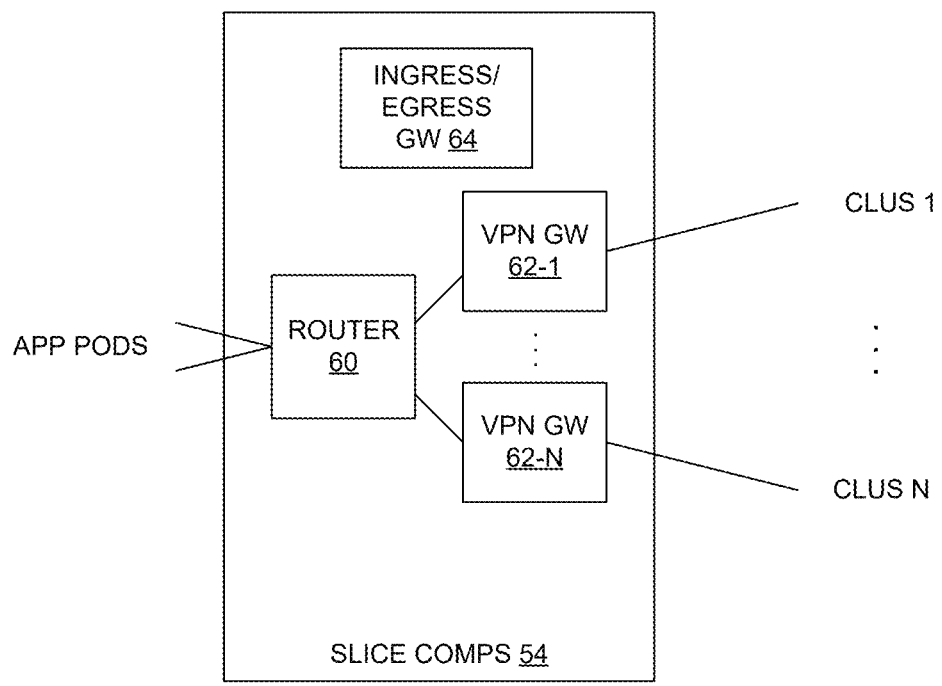
FIG. 5 is a block diagram of slice network components.

FIG. 5 shows the structure of the slice components 54, namely as including a slice-specific router (slice router) 60 and a set of VPN gateways (GW) 62 that interconnect the local cluster C to the various remote clusters C. It will be appreciated that the router 60 effects routing in the overlay network 56 using network addresses defined therein, as distinct from network addresses defined in the underlying substrate network 12. Of course, all overlay network traffic is carried as application-level payloads in the substrate network 12, which may use known VPN techniques. As shown, the slice components 54 may also include one or more ingress and/or egress gateways 64.

Thus, in this embodiment an application slice is an application overlay infrastructure that includes network services/components distributed across multiple clusters C to provide a surface area with its own layer-3 (L3) domain and IP address space. Application slices may extend over multiple clusters C that are deployed in one or more public/private clouds 10 or data centers/edges. The application slice mechanism provides a framework for scalable secure segmentation of pods 28 that allows traffic prioritization, security isolation, service discovery for service-to-service communication across the slice, granular governance, and failover containment. In addition, this mechanism enables granular application performance management using artificial intelligence/machine learning (AI/ML) algorithms and AI driven AppNetOps (AIOps). Finally, an application slice is considered as an "overlay" because it can work with existing cloud-service infrastructure (such as Kubernetes) and may not require significant changes to existing code. For example, a Pod 28 may be included in an application slice by simple addition of an annotation to a Pod specification in the Kubernetes system. In another example, an application Pod 28 may be included in an application slice by associating a namespace with the application slice.

Referring again to FIGS. 4-5, the slices 70 can have a variety of features and functions according to the listing below. Not all of these may be utilized in all embodiments. In the listing, the indication "NW" is used to indicate presence of the respective feature when slices include overlay network functionality as described above with reference to FIG. 4.

Application Slice Features
- Slice across multiple attached or registered worker clusters C
  - Slice per application or per set of applications 28, application PODs deployed across the slice
- Separate L3 domain per slice (NW), overlay network
- Secure slice with VPN Gateways for inter-cluster communication and mTLS tunnels for intra-cluster communication
- Slice specific service discovery using service export/import across the slice and lookups using Mesh/Slice DNS service
  - Service discovery in headless service deployments
  - Service discovery with Egress and Ingress gateways to scale the service deployment
- Slice specific ingress/egress gateways for east/west (E/W) and north-south (N/S) traffic
  - Orchestration and life-cycle management of the ingress/egress gateways
  - Orchestration/configuration of virtual services, routes, paths based on the service imports and configuration
  - generate and configuration of certificates for ingress/egress gateways
- Slice specific overlay network policies normalized across the slice
  - Slice specific namespace-based network policies normalized across the slice
- Slice specific resource quota management normalized across all the slice worker clusters
  - Slice scoped and associated namespaces scoped resource quota configuration, utilization monitoring and event notification
- Slice specific slice namespace, namespace associations, global namespace, and normalization of namespace sameness across the slice worker clusters
- Slice specific Traffic Management—for inter-cluster traffic
  - Traffic Control—Bandwidth control (NW)
  - Slice specific QOS profiles (NW)
  - Slice Priority—e.g., high, medium, and low priority slices
  - HTB (token bucket) and DSCP code-based prioritization
  - Traffic Segmentation across slices and other applications in the slice worker clusters (NW)
- Slice gateways 62 specific to application slice (NW)
  - Carries only its application inter-domain traffic
- Namespace-driven connectivity
  - Application Pods 28 connect using network service name (slice name) or namespace name
  - Provides AI/RL policy applications driven AIOPs mechanisms for tuning global/local load balancers, resource schedulers, auto-scalars, deployment specs, selection of edge resource, path selection and workload placement across the slice worker clusters
- Secure Inter-domain connectivity across slice worker clusters Discovery and Orchestration of Application Slices During an application slice deployment—network services are discovered using the slice network namespace; and inter-domain secure overlay links (VPN etc.) are established to build a distributed applications specific application overlay network slice.

Slices can use service export/import functions to export/import Kubernetes services and Istio virtual services for slice-wide service discovery. In addition, a Slice Ingress gateway can be used to export services and a Slice Egress gateway can be used for imported services. One or more application namespaces can be associated with these slices. Slice isolation can be enabled by implementing network policies for these namespaces. Slices are defined across clusters C, but in some deployments, it may be beneficial to use slices that exist within a single cluster.

Slice Namespace

The slice namespace is an association of application slice wide L3 network namespace and one or more cluster Kubernetes namespaces with the slice. Slice namespace provides slice-specific namespace associations for all the services on the application slice to be associated with. All the services that are deployed on the slice across all the clusters are associated with the slice namespace associations and are discovered across the slice. The services that are registered with the application slice namespace can be looked up by any of the services on the application slice. The Slice Operators (Slice Controllers) 52 in all the slice associated clusters C coordinate to normalize the slice namespace across those clusters. They also monitor and enforce the slice namespace associations within the slice. Any application/service to be deployed on the slice must be in one of the associated namespaces of the slice. These services are not visible or accessible outside of the slice (unless exception rules are applied). The slice namespace provides isolation of services to application slice. Slice network policies can be associated with namespaces that are associated with the slice namespace. These slice network policies provide isolation of traffic and traffic control within the slice and between slice and the other cluster resources.

Federated Security

The Application Slice offers an important feature—federated security—that automates the creation of Secure Overlay Links (SOL)—VPNs/VPCs or other wide area secure interconnection technologies, node and workload identity management, applying global security policies and removes the burden of the security management from the operational staff and further improves the overall security of the network through automation.

AIOps on Application Slice

During application runtime, a component AIOps (AI Ops) ingests telemetry from the overlay network services to ML/RL agents. The RL agents assist in tuning the overlay network services parameters to optimize the distributed application performance.

Mesh System Components: Mesh system components include the network service mesh Control plane and Dataplane components to create and manage the Application Slice L3 overlay network. These components include the network service manager, network service Dataplane daemons, network service registry, forwarders and Webhooks management functions. Network service mesh control plane enables the automation of orchestration of slice connectivity between the slice network service clients (Application Pods 28) and slice network services/components 54 such as Slice Routers 60.

Application Mesh Controller ("Backend," "KubeSlice Controller") 18

The Backend 18 provides management, visualization, dashboard functions and APIs to manage the life cycle of the slice and slice policy deployment across multiple clusters. In one embodiment the Backend can be implemented using Cloud services and, in another embodiment, as "KubeSlice/

Mesh Controller" can be implemented using Kubernetes native constructs and custom resource descriptors (CRDs).

The Backend/KubeSlice Controller is installed in one of the clusters and provides a central configuration management system, for slices across multiple clusters. The KubeSlice Controller can be installed in one of the worker cluster or in a separate cluster.

The Backend/KubeSlice Controller 18 provides:
A communication interface through which Slice Operators on multiple clusters can connect to it. The slice configuration that includes slice VPN gateway, service discovery with service import/export, namespace bindings, resource quota, and ingress/egress gateway related parameters are relayed to the Slice Operators on registered clusters.
Creation and management of cryptographic certificates for secure slice VPN gateways.
APIs through the API Gateway for the KubeSlice Manager to create and manage the application slices.

Slice Management Functions and APIs
Provides APIs for UI Slice Management and Application onboarding
Manages encrypted resources, keys, etc. needed for Slice VPN gateways 62
Interacts with the Slice Operators 52 in the clusters for management of slice and slice resources, slice configuration, service export/import for discovery, status, and telemetry, etc.
Management of certificates for secure Slice VPN gateways 62
Tenants/Customers/User/Operators management
Provides mechanisms to create customers/tenants and associated user and service accounts and related projects and other per customer/tenant data
Customer/Tenant/User roles and responsibilities, Role based Permissions and Role based access control (RBP/RBAC) management
Define roles and responsibilities for slice management
Slice Policy management functions and APIs
Provides APIs for UI and Slice Policy Operator and ML/RL cluster Slice Policy Functions Slice Operator 52
In accordance with certain embodiments, the Slice Operator (or Slice Controller) 52 may be a Kubernetes Operator component that manages the life cycle of Application Slices related custom resource definitions (CRDs) in worker clusters. In certain embodiments, there may be one or more Slice Operators in a worker cluster. It helps to manage the Application Slices with a declarative management support for GitOps based workflows. A SliceCtl tool may be used to manage the Slice CRD resources. Application Slices CRDs can be managed using Cluster Controller 32 as well.
Reconciles Slice resources in the worker cluster and with application mesh controller 18
Creates Slice components needed for Slice VPN Gateway connectivity, Slice Service Discovery, and Slice Policy
Auto insertion/deletion of the Slice components to accommodate slice cluster topology changes
Interacts with Slice components for Config/Status updates
Interacts with the Backend to manage the life cycle of the Slices, Slice Config, Slice Status, Slice Namespace, Slice Telemetry and Slice Policy
Interacts with the Backend to facilitate Network Policy Deployment and Service Discovery across the Slice
Interacts with the Backend to Export Istio Services labelled for export to other clusters attached to the Slice
Interacts with the Backend to Import Istio Services from other clusters attached to Slice
Interacts with Backend for RBAC for managing the Slice Components
Supports Slice and Slice Policy resource management using GitOps workflows and declarative management.

SliceCtl
In accordance with certain embodiments, SliceCtl is a CLI tool to interact with Slice Operator 52 and manage slices and slice related resources on the cluster. SliceCtl commands include install, register, uninstall, de-register, login, register cluster, attach/detach slice, delete slice, service import/export, etc.

Slice Overlay Network
In an embodiment such as that of FIG. 4, each slice 70 has its own IP L3 domain (e.g., subnet /16) and each cluster C that is attached to the slice gets a part of the subnet (e.g., /24). Slice VPN Gateways 62 connect to local Slice Routers 60.

Slice VPN Gateway 62
Slice VPN Gateway 62 is a slice network service component that provides a secure VPN link connection endpoint for the Slice on a cluster C. A pair of Slice VPN Gateways 62 are deployed to connect every pair of clusters C attached to a Slice. A VPN Gateway 62 connects to a remote VPN Gateway 62 in a remote cluster C. Slice Operator 52 manages the life cycle of the Slice VPN Gateways 62. Slice Operator 52 deploys and manages the configuration and keys/certificates for the operation of the Slice VPN Gateways. Slice Operator 52 interacts with Backend to get the Slice configuration and auto inserts the Slice components like VPN Gateways 62 and Slice Routers 60 for the Slice. Slice Operator 52 constantly interacts with Slice VPN Gateways 62 for status, keys/certificates, and configuration changes. Backend manages the VPN gateway pairs for slice attached clusters, creates the keys and configuration for the operation. In certain embodiments, there may one or more replicas of Slice VPN Gateway network services.

Slice Traffic Control
Slice VPN Gateways 62 are the exit/entry points for all the E/W traffic to/from the Applications Pods 28 on the Slice to remote cluster Slice VPN Gateways 62. Slice VPN Gateways 62 are configured with Traffic Control (TC) Policies (with a QOS profile) to manage the traffic shaping for the slice. Slice TC on VPN Gateways 62 support marking the packets with DSCP/COS code points to provide prioritization of the Slice traffic.

Slice Router 60
Slice Router 60 is a slice network service (VL3 NSE) component that provides a virtual L3 IP switching functionality for the slice. Each Slice in a cluster C has one Slice Router 60, with the possibility of a redundant pair option. Slice Operator 52 manages the life cycle of the Slice Router 60, which includes deploying, configuring and continuously monitoring/managing the Slice Router 60 for the Slice. All the Application 28 Pods of the cluster C on the Slice connect to Slice Router 60 of the slice. Slice Router 60 provides the connectivity to the rest of the Slice components, which are Applications distributed across the clusters C.

When an Application Pod 28 connects to the Slice (as a network service client NSC) on a cluster C, the Slice Router 60 manages the establishment of the Slice Interface (NSM interface) on the Application Pod 28—done automatically via injection into the Pod 28. The Application Pods 28 use this Slice Interface to communicate with the other Applications/Network Services (local or remote) on the Slice. Slice Router 60 manages the IPAM/routes for the Slice cluster applications/components.

NetOps

Each Slice in a cluster is associated with a QoS profile. The QOS profile is applied on the tunnel interface of the VPN gateways 62. In addition, on the Gateway nodes 50 the NetOp Pods enforces the QoS profiles for all the Slices. It uses Linux TC (Traffic Control) to apply Hierarchical Token Bucket (HTB), priority and DSCP values for Slice traffic classification.

Mesh DNS (KubeSlice DNS)

Mesh DNS is a CoreDNS server that is used to resolve service names exposed on application Slices. The Slice Operator 52 manages the DNS entries for all the services running on the Slice overlay network(s). When a service is exported on the slice by installing a ServiceExport object, the Slice Operator 52 creates a DNS entry for the service in the Mesh DNS and a similar entry is created in the other clusters that are a part of the Slice.

Slice Istio Components

The application mesh works with Istio service mesh components in a cluster. If Istio is deployed on a cluster, it uses Istio ingress/egress gateway resources to create Slice Ingress/Egress Gateways. These Slice Ingress/Egress Gateways can be manually deployed or auto deployed as part of the Slice. Slice Ingress/Egress Gateways can be deployed for E/W traffic Slice Egress/Ingress Gateways can be used to export/import Slice connected application services across the Slice clusters. A Slice Ingress Gateway can be used to export the services from a Slice cluster. A Slice Egress Cluster can be used to import the slice services from remote Slice clusters. Slice Service Discovery uses the Slice Ingress/Egress Gateways to export/import the application services across the Slice clusters. Deployment of the Slice Ingress/Egress Gateways on a Slice is optional.

In other embodiments, application mesh can work with other types of services meshes like Linkerd, Consul etc.

User Interface (UI)

UI (also known as "KubeSlice Manager") is a web application to manage the application slices network across multiple clusters C with KubeSlice platform. The UI can be used for Slice management operations like—create/update/delete slices, associate namespaces, network policies, resource quotas to slice, onboard applications to slice, etc. and Slice Policy management. Slice dashboards provides observability, events into the Slice operations—slice network services, slice services and application services deployed on the Slice across multiple clusters. It allows users to view and explore the Slice services topology (service map), slice service discovery data, traffic, latency, and real time health status.

Deploying Application Slice Across Multiple Clusters

The mesh allows users to create and manage application slices across multiple clusters C. Based on role-based permissions (RBP) and RBACs, a user can be Cluster Admin, Slice Admin, Application TL, Slice User, Developer, etc. The Mesh allows multiple ways to create and deploy the slices—UI, Helm Charts/GitOps and Backend APIs.

In some embodiments, the following tasks are performed in preparation for deploying a slice on a cluster:
1. Create worker clusters C, and configure and deploy Istio and other system components
2. Deploy the Mesh/KubeSlice System and Slice Operator 52 components
3. Identify and label a node 20 in a cluster C as a Gateway Node 50 and open appropriate ports (UDP/TCP) for communication Registering Clusters Once the KubeSlice/Mesh system components and Operators are installed Users can register the worker clusters C with Controller 52. The user can use Helm charts or UI (KubeSlice manager) to register the clusters. Once clusters are registered user can create slices.

Installing Slice

There are multiple ways a slice can be created with worker clusters C:
1. Helm chart: Users can specify the slice parameters as values and apply slice helm chart to Backend/Controller 18. Slice controller creates appropriate SliceConfig resources (CRDs) for the configuration. The Slice Operator 52 interacts with the Controller 18 to get the SliceConfig and uses these parameters to create and deploy the slice components on the worker cluster.
2. User can use UI (KubeSlice Manager) to register and create slice. UI interacts with Slice Controller 18 using Controller APIs to create SliceConfig resources (CRDs). Slice Operator 52 interacts with the Controller 18 to get the SliceConfig and uses these parameters to create and deploy the slice components on the worker cluster.

Once the slice components are deployed the Slice VPN gateways in worker clusters connect to each other to form a full mesh connectivity.

Deploying Applications Over Application Slice

Users can deploy the Application Services (App Pods 28) on to the slice on a cluster C to access other Application Services that are deployed on the slice in other attached clusters. Slice provides the network connectivity and service discovery to enable service-to-service communication. Users can deploy the Application Service on to a slice in multiple ways.

Users can update the service deployment specifications with slice related annotations to onboard the service and related replicas on to the slice.

Users can also associate namespaces with slice. In auto onboarding mode, all the services that are deployed on the associated namespaces are onboarded on to the slice the Slice Operator 52 by updating the deployment specs of the services.

Users can also use UI to onboard the applications/services on to a slice. Users can select and associate namespaces to slice. SliceConfig will be updated with selected namespace associations. Slice Operator 52 onboards the services that belong to the namespaces.

In one embodiment, onboarding of a service on to the slice will result in adding an overlay network interface (NSM interface) to the POD. The POD is attached to the slice overlay network. This will allow that service/POD to communicate with all the other PODs/Services that are attached (onboarded) to slice overlay network using IP/TCP/HTTP/GRPC/UDP/etc. protocols.

Aspects of Novelty

The following are seen to be novel aspects of the presently disclosed mesh network/infrastructure:
- A unique global construct called Application Slice
- A novel way to create and manage an IP L3 overlay network per slice across multiple Kubernetes clusters
- Clusters are interconnected using VPN gateways
- One or more clusters are attached to the slice
- Each slice has its own separate L3 domain address space—separate Subnet Each cluster that is part of the slice has a part of the slice-subnet All the Pods that are connected to slice can connect to each other on Slice Subnet A novel way to create an overlay L3 network using Slice Routers across the slice The overlay L3 network is collection of vWires, and the connectivity is driven by the network service names (namespace-driven)

A novel way to associate workloads/applications to a slice

Applications/Pods that are attached to slice have an IP interface to the slice specific L3 address space A novel way to create a global namespace per slice and normalize that across the slice (in all the clusters that are attached to slice)

A novel way to create and associate network policy per slice and normalize that network policy across the slice (in all the clusters attached to the slice)

A novel way to associate namespaces and associated resource quotas per slice and normalize them across the slice (in all the clusters attached to the slice)

A novel way to perform the Slice Service discovery

All the services that are attached to the slice (across one or more clusters) are visible to each other via service discovery A novel way to export services from one attached cluster in the slice to across the slice (in all the clusters that are attached to the slice). The exported services are only visible to the applications/services thar attached to the slice A novel way to perform performance optimization of applications deployed on the slice using AIOps driven policies and operations.

While various embodiments of the invention have been particularly shown and described, it will be understood by those skilled in the art that various changes in form and details may be made therein without departing from the scope of the invention as defined by the appended claims.

What is claimed is:

1. A distributed computing system, comprising:
a plurality of clusters interconnected by a substrate network, each cluster including a plurality of machine compute nodes connected by a cluster network and collectively executing a set of microservices in respective containers organized into pods each having multiple containers, the pods being individually addressable in the cluster network; and
application slice components distributed among the clusters to define and operate a plurality of application slices each providing application slice services for respective sets of pods distributed among the clusters, the application slice components for a given application slice at a given cluster including one or more slice routers and one or more slice gateways, each slice gateway providing an interface between local pods of the given application slice and remote pods of the given application slice on a respective different cluster, the slice routers and slice gateways for the given application slice collectively forming a respective slice-specific overlay network providing cross-cluster network services including service discovery and traffic forwarding with isolation from others of the application slices that co-reside on the clusters with the given application slice.

2. The distributed computing system of claim 1, wherein each slice-specific overlay network has a respective separate layer-3 domain address space.

3. The distributed computing system of claim 2, wherein each slice-specific overlay network is a corresponding distinct subnetwork using a corresponding sub-space of a space of network addresses.

4. The distributed computing system of claim 3, wherein each cluster of a given application slice utilizes a respective part of the subnetwork and sub-space.

5. The distributed computing system of claim 3, wherein all pods connected to given application slice connect to each other on the respective slice sub-network.

6. The distributed computing system of claim 1, wherein the pods connect to the slice overlay networks using network service names.

7. The distributed computing system of claim 1, wherein a global namespace is created per application slice and normalized across all clusters attached to each slice.

8. The distributed computing system of claim 1, wherein each application slice is associated with respective namespaces, network policies and resource quotas for respective applications on the application slice and normalized across all clusters attached to each application slice.

9. The distributed computing system of claim 1, wherein all services attached to a given application slice across the clusters are visible to each other via service discovery.

10. The distributed computing system of claim 9, wherein the services include exported services that are exported from one attached cluster to another attached cluster, the exported services being visible to applications/services attached to the given application slice and not visible to applications/services attached to others of the application slices.

11. A method of providing a service, comprising:
executing a plurality of sub-services in respective containers of respective clusters of machine compute nodes, the containers being organized into pods each having multiple containers, the pods being individually addressable in a respective cluster network; and
deploying and operating application slice components among the clusters to define and operate a plurality of application slices each providing application slice services for respective sets of pods distributed among the clusters, the application slice components for a given application slice at a given cluster including a slice router and one or more slice gateways, each slice gateway providing an interface between local pods of the application slice and remote pods of the given application slice on a respective different cluster, the slice routers and slice gateways for a given application slice collectively forming a respective slice-specific overlay network; and
by the slice-specific overlay network of each of the application slices, providing cross-cluster network services including service discovery and traffic forwarding with isolation from other application slices that co-reside on the clusters with the given application slice.

12. The method of claim 11, wherein each slice-specific overlay network has a respective separate layer-3 domain address space.

13. The method of claim 12, wherein each slice-specific overlay network is a corresponding distinct subnetwork using a corresponding sub-space of a space of network addresses.

14. The method of claim 13, wherein each cluster of a given application slice utilizes a respective part of the subnetwork and sub-space.

15. The method of claim 13, wherein all pods connected to given application slice connect to each other on the respective slice sub-network.

16. The method of claim 11, wherein the pods connect to the slice overlay networks using network service names.

17. The method of claim 11, wherein a global namespace is created per application slice and normalized across all clusters attached to each application slice.

18. The method of claim 11, wherein each application slice is associated with respective namespaces, network policies and resource quotas for respective applications on the application slice and normalized across all clusters attached to each application slice.

19. The method of claim 11, wherein all services attached to a given application slice across the clusters are visible to each other via service discovery.

20. The method of claim 19, wherein the services include exported services that are exported from one attached cluster to another attached cluster, the exported services being visible to applications/services attached to the given application slice and not visible to applications/services attached to others of the application slices.

* * * * *